US012138946B2

(12) United States Patent
Nykerk (10) Patent No.: US 12,138,946 B2
(45) Date of Patent: Nov. 12, 2024

(54) LIGHT VEIL (71) Applicant: Flex-N-Gate Advanced Product Development, LLC, Tecumeseh (CA)

(72) Inventor: Todd Nykerk, Holland, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 516 days.

(21) Appl. No.: 16/807,989

(22) Filed: Mar. 3, 2020

(65) Prior Publication Data

US 2020/0282925 A1 Sep. 10, 2020

Related U.S. Application Data (60) Provisional application No. 62/813,245, filed on Mar. 4, 2019.

(51) Int. Cl.
*B41M 5/00* (2006.01)
*B60Q 1/26* (2006.01)

(52) U.S. Cl.
CPC ......... *B41M 5/0047* (2013.01); *B60Q 1/2619* (2013.01)

(58) Field of Classification Search
CPC ............................ B60Q 1/2619; B41M 5/0047
See application file for complete search history.

(56) References Cited

U.S. PATENT DOCUMENTS

| | | | |
|---|---|---|---|
| 5,353,154 A * | 10/1994 | Lutz | G02B 5/287 |
| | | | 359/582 |
| 10,443,790 B2 | 10/2019 | George et al. | |
| 2004/0080938 A1 * | 4/2004 | Holman | F21S 41/12 |
| | | | 362/245 |
| 2006/0024476 A1 | 2/2006 | Leland et al. | |
| 2007/0289468 A1 | 12/2007 | Teng | |
| 2008/0299315 A1 * | 12/2008 | Iwase | B41M 5/0047 |
| | | | 427/265 |
| 2014/0264294 A1 | 9/2014 | Holman et al. | |

(Continued)

FOREIGN PATENT DOCUMENTS

| | | |
|---|---|---|
| CN | 106827846 A | 6/2017 |
| EP | 1344688 A2 | 9/2003 |

(Continued)

OTHER PUBLICATIONS

PCT Patent Application No. PCT/US2020/020809 International Search Report and Written Opinion issued May 14, 2020.

(Continued)

*Primary Examiner* — Alex A Rolland
(74) *Attorney, Agent, or Firm* — AVEK IP, LLC (57) ABSTRACT A method of making a fascia for an automobile includes providing an article, the article being one of translucent or transparent and applying a deposited pattern onto at least a first portion of a first side of the article. The method further includes forming the article into a shape, the shape being configured to be consonant with a vehicle exterior configuration. A fascia system includes a transparent member mounted on a vehicle, the member having printed matter on one side, and the member being included into a vehicle exterior design. Additionally, the member is oriented in front of an illumination device and is illuminated by the device.

17 Claims, 5 Drawing Sheets

(56) References Cited

U.S. PATENT DOCUMENTS

| | | | | |
|---|---|---|---|---|
| 2015/0042716 A1* | 2/2015 | Beier | ............... | B25J 11/0075 |
| | | | | 347/14 |
| 2017/0313061 A1* | 11/2017 | Profaca | ............... | B41J 2/16505 |
| 2017/0314759 A1 | 11/2017 | Nykerk et al. | | |
| 2018/0149335 A1* | 5/2018 | Paroni | ............... | F21S 41/285 |
| 2018/0216799 A1* | 8/2018 | Inoue | ............... | F21V 15/01 |
| 2018/0252403 A1 | 9/2018 | Hamid et al. | | |
| 2018/0274745 A1 | 9/2018 | Nykerk et al. | | |
| 2019/0309924 A1 | 10/2019 | Nykerk et al. | | |

FOREIGN PATENT DOCUMENTS

| | | |
|---|---|---|
| FR | 3061676 A1 | 7/2018 |
| JP | H11170907 A | 6/1999 |

OTHER PUBLICATIONS

Extended European Search Report issued Jul. 12, 2022 in related EP Application No. 20766046.5.

* cited by examiner

LIGHT VEIL

CROSS-REFERENCE TO RELATED APPLICATIONS

This application claims the benefit of U.S. Provisional Patent Application No. 62/813,245 filed on Mar. 4, 2019, the entire contents of which are herein incorporated by reference.

BACKGROUND OF THE INVENTION

1. Field

The disclosed embodiments relate generally to the field of automotive exteriors. More specifically, the disclosed embodiments relate to automobile fascia systems and arrangements.

2. Description of the Related Art

The term fascia is used in the automotive industry in reference to plastic materials used at various locations on a vehicle. Most commonly, fascia panels are implemented into the front and rear of a vehicle. The facias can be incorporated at, e.g., the vehicle's headlamp area, grill, bumper, side paneling, into or near a taillight arrangement, as well as other locations.

In many instances, facias exist as a relatively soft solid plastic pieces that are mounted on top of the bumper underneath the headlights. Normally the facias are incorporated such that they are conformed into an overall front end "look" of the vehicle. This requires that the facias be mounted such that some level of uniformity is created across the front of the vehicle. Additionally, the shape of the devices are normally also incorporated into the aerodynamic design for the vehicle.

SUMMARY

In an embodiment, a method of making a fascia for an automobile is provided. The method includes providing an article, the article being one of translucent or transparent; applying a deposited pattern onto at least a first portion of a first side of the article; and, forming the article into a shape, the shape being configured to be consonant with a vehicle exterior configuration.

In another embodiment, a fascia system is provided. The fascia system includes a transparent member mounted on a vehicle, the member having printed matter on one side of the member; and, the member being included into a vehicle exterior design, the member being oriented in front of an illumination device, the printed matter being illuminated by the device.

BRIEF DESCRIPTION OF THE SEVERAL VIEWS OF THE DRAWINGS

Illustrative embodiments are described in detail below with reference to the attached drawing figures, which are incorporated by reference herein and wherein.

DETAILED DESCRIPTION

Embodiments provide systems including a decorative fascia and a related method for making the device. More specifically, a light veil is created by printing matter on one side of a clear or translucent article, then optionally bending, molding, or otherwise conforming the article into a particular shape for the purpose of being installed into a desired vehicle exterior configuration. In some embodiments, the processed article is shaped to be consonant with an overall vehicle exterior design in terms of not only shape, but color. In other embodiments, the article is additionally designed to include additional designs intended to be animated by illumination created behind the article once processed and installed. In still other embodiments, the matter is printed on the interior side of the article where it is protected from the elements.

An embodiment is disclosed in FIGS. 1-5. Referring first to FIGS. 1A-B, a flat clear (or alternatively translucent) plastic member 100 is shown from a top view (FIG. 1A) and a side view (FIG. 1B). As is shown in FIG. 1B, plastic member 100 has a first "A" side 102, a second "B" side 104, and a first end 112 and a second end 114. One of the two sides (A or B) will be, when the article is installed onto a vehicle, on the exterior, and the other will be in the interior. The panel, in embodiments is formed as an obtuse triangle defined by a first, a second, and a third side, 106, 108, and 110 respectively. Sides 106 and 108 form an acutely angled corner at a sharp point 112. Sides 106 and 110 form a second acutely angled corner at a point 114. Sides 108 and 110 form an obtusely angled corner 116, but corner 116 has been rounded.

Figure 1A:
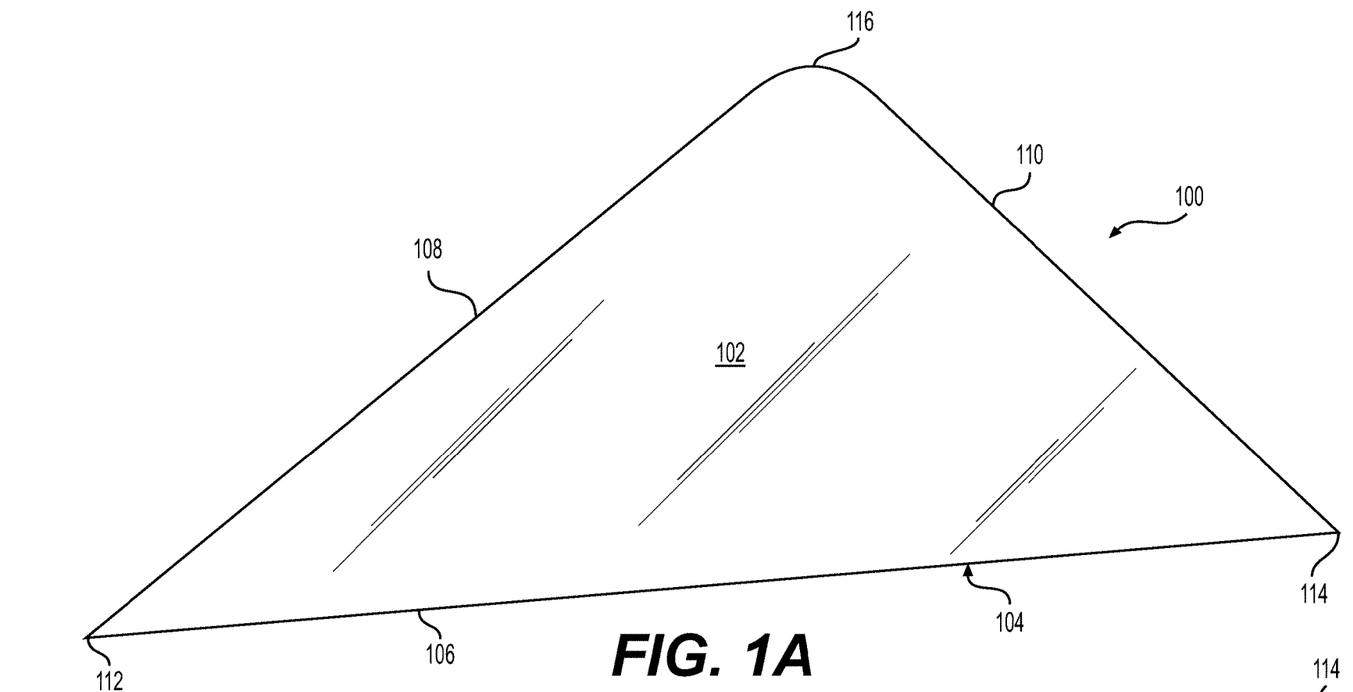
FIG. 1A shows a top view of a pre-processed clear plastic device and FIG. 1B shows the same article from a side view.
Figure 1B:
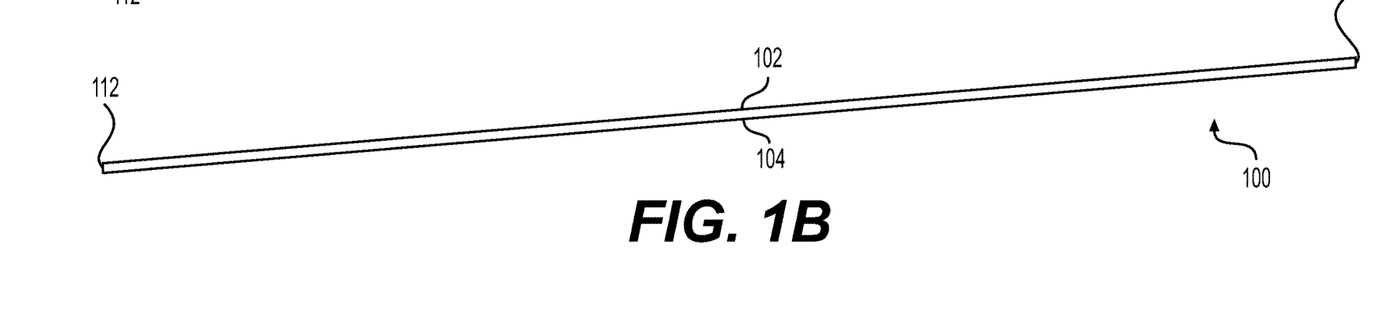

FIG. 1B shows the same article from a side view, and in this view it can be seen that the member 100 is flat (which makes it better for receiving print), and has a consistent thickness. In selecting a material, it is possible that a clear thermoplastic, e.g., Polycarbonate, Poly(methyl methacrylate) (PMMA), Polypropylenes (PPs), Natural PP, Polycarbonate (PC) blended with Acrylonitrile Butadiene Styrene polymer (ABS), Natural PC/ABS, or numerous other substances could be used. Preferably ones which are transparent, or at least translucent, are moldable, and in embodiments, are capable of receiving ink-jet printing.

To meet the design demands for a vehicle on which the panel will later be installed, the panel 100 may have to be cut from a sheet or other configuration. The sheet thickness selected could be thicker or even thinner than what is shown in the figures, which are intended to be exemplary only. Alternatively, the panel 100 can be formed into the shape desired according to some process, rather than cut.

Once the flat panel 100 has been cut or otherwise formed into the desired shape, it is printed with an ink or other coating on one of the two sides (A or B). In some embodiments, the inside surface 104 can be selected in order to avoid exposure to the elements (wind and weather). In other embodiments, the ink could be applied to the outside 102, e.g., if necessary, to create a desired look, or create consonance with a surrounding design scheme.

The printing processed used could be an inkjet printing process. More specifically, a flatbed or other type of printer could be used. Alternatively, the printing could be done using a multi-axis robotic system (e.g., the inkjet head could be mounted on a robotic arm). This robotic system could be used to print onto non-flat, e.g., three-dimensional surfaces if desired. The flatbed sorts of printers involve the placement of the article on a supporting surface, and one or more print heads deposit ink onto the plastic from above. The printed matter, ordinarily, will be instantaneously dried using ultraviolet light (UV) during the printing process. Further, some printing units also enable the deposition of protective coatings atop the ink once deposited. For example, for polycarbonate panels, hard coat can be applied prior to any forming for the purpose of providing UV protection.

In embodiments, an ink can be deposited onto one of sides 102 or 104, and then optionally, a coating deposited on top of the printed matter using the same, or some additional processing device. Alternatively, a lithographic (litho) press, digital press, or other system enabling printing onto plastic could be used. Additionally, the ink selected for use can be fade resistant if the intended installation on the vehicle involves exposure to direct or indirect sunlight regardless of the side ink is printed onto.

Figure 2A:
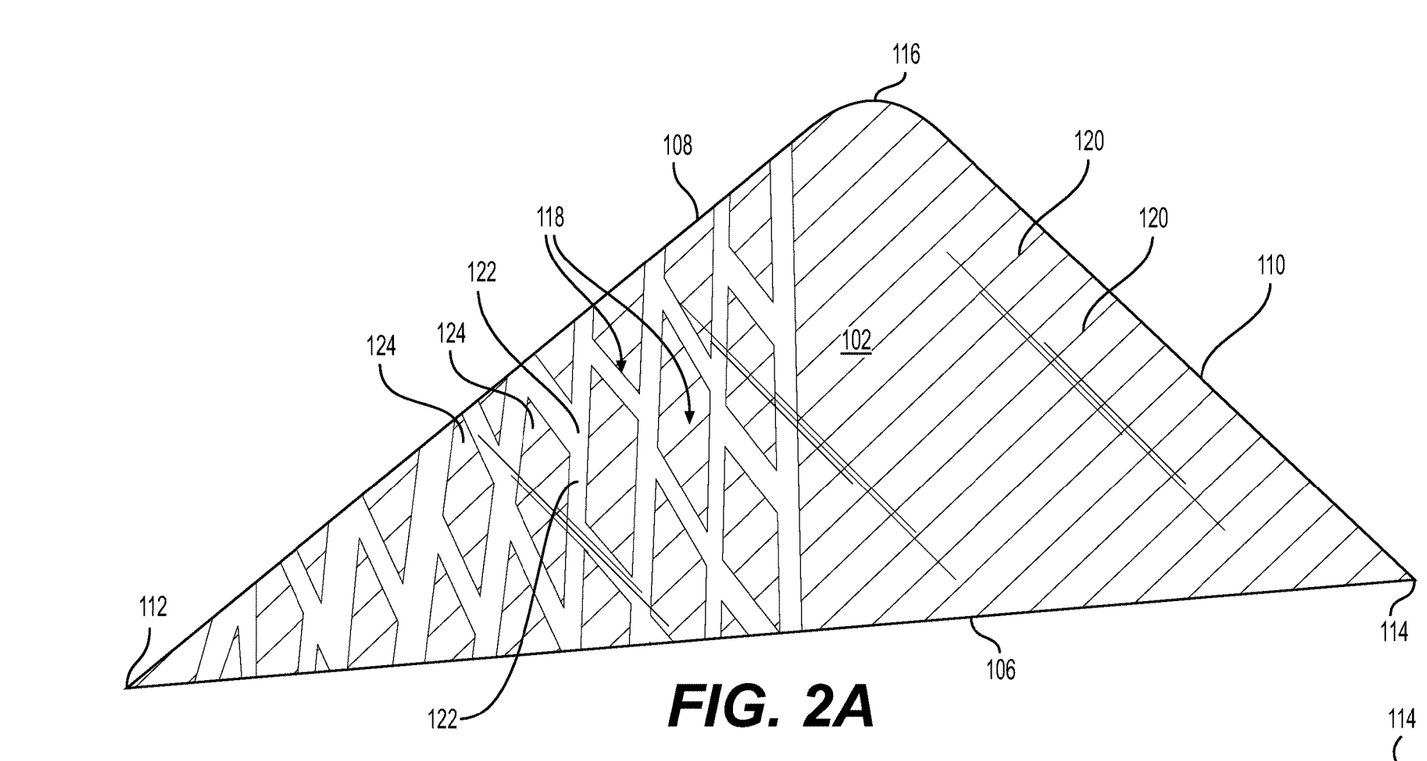
FIG. 2A shows a clear plastic device on which printing has occurred on one side.
Figure 2B:
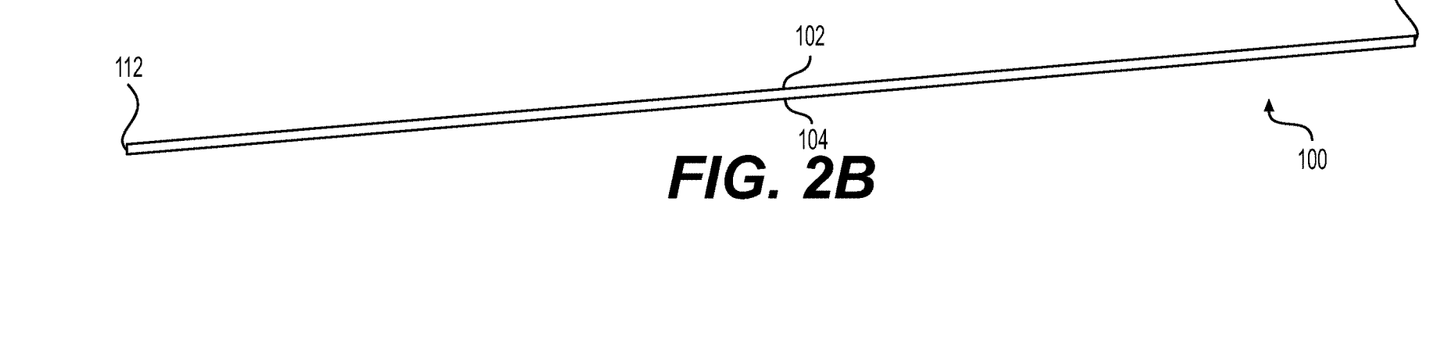
FIG. 2B shows the same device from a side view.

FIG. 2A shows the backside 104 of the panel 100 once it has been printed. Two distinct portions, 118 and 120 are created in the panel (can be seen through the panel, and the print is on the back side). As can be seen, in this embodiment, a decorative configuration has been printed in a portion 118 of the panel 100. More specifically, a honeycomb pattern has been created in which transparent wall cross sections 122 divide more occlusive cells 124. On another portion 120 of the panel 100, a solid color has been painted, and there is no pattern. This panel might be translucent, or in some embodiments could be printed to totally occlude light. Alternatively, distinct or common decorative patterns could be printed on either or both/all portions. It should be considered that numerous portions of any panel could be painted in any variety of manners in order to accomplish vehicle exterior design objectives. Here, as an example, the two distinct portions 118 and 120 of the panel 100 exist on the other side of what will be a fold formed about an axis A (see FIG. 3A) once the panel is subjected to a forming process.

Figure 3A:
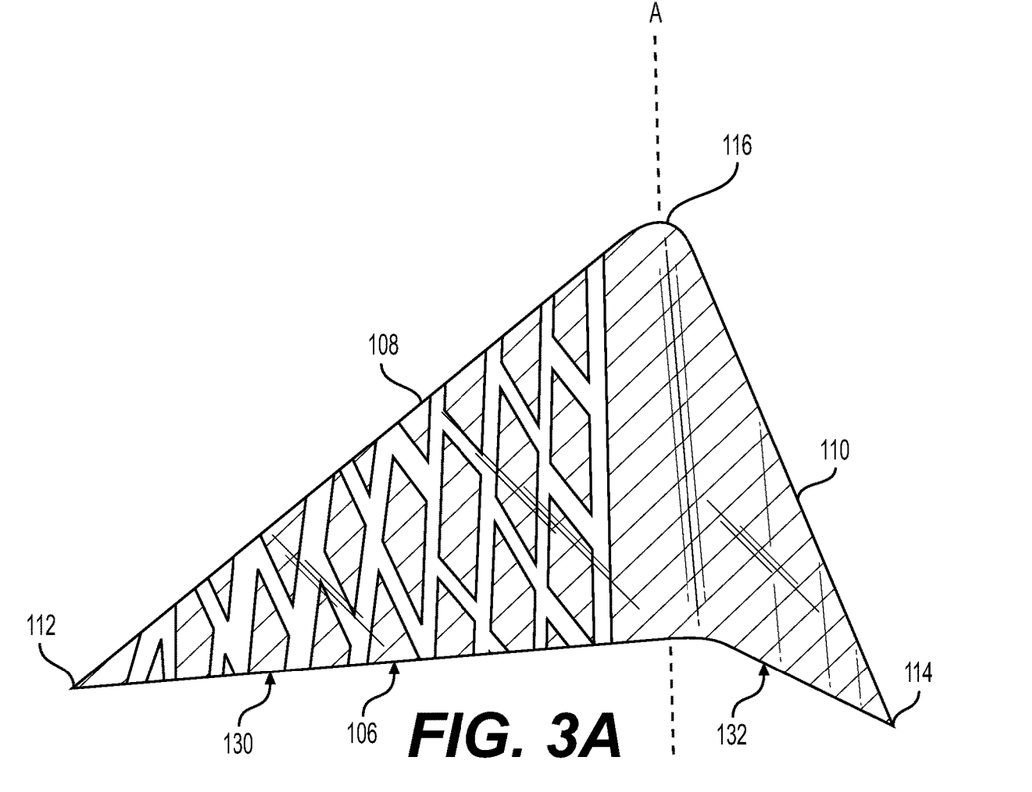
FIG. 3A shows the device shown in FIGS. 2A and 2B after it has been formed prior to installation.
Figure 3B:
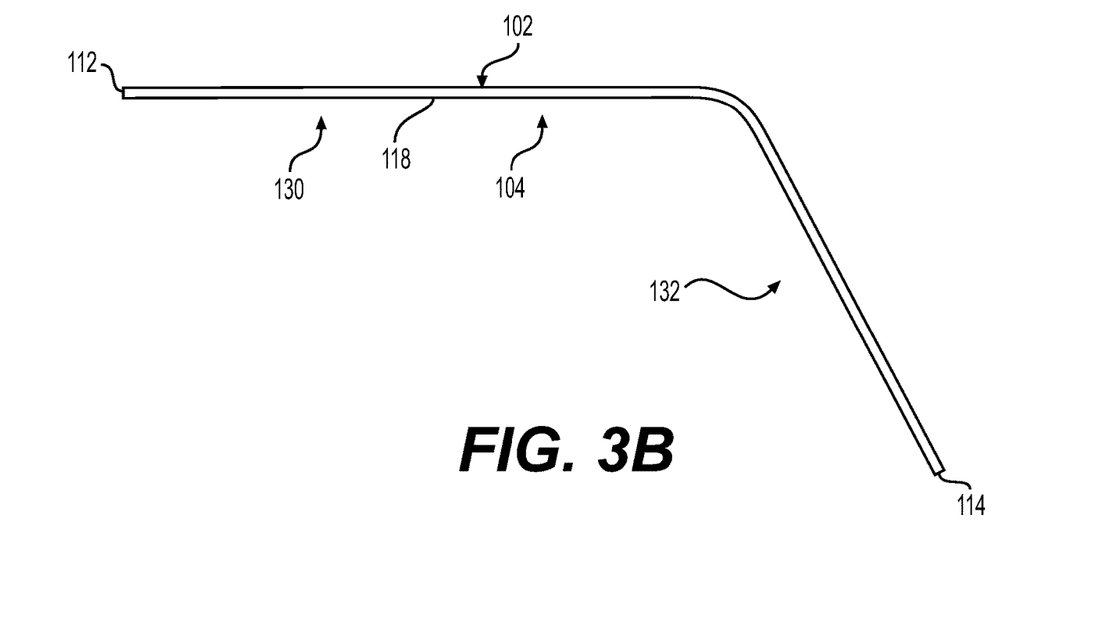
FIG. 3B shows the same device from the side.

After the ink and any coatings have been deposited and dried, the article can be subjected to a forming process. In this forming process, the article is typically subjected to elevated temperatures, and then pressed onto a mold. In the FIGS. 2-3 embodiment, the mold is used to create a fold about an axis A, as shown in FIG. 3A. This creates a first planar part 130 which is angled relative to a second planar part 132. In the disclosed embodiment, the first planar part 130 displays the decorative arrangement where light passes through some of the design unmodified (the clear honeycomb walls 122) and includes other portions that modify the light (the cells 124). The second planar part 132, in the disclosed embodiment, is solid and occludes or otherwise modifies the light. Those skilled in the art will recognize that numerous other processes could be used in the alternative. Regardless, once the process is complete, the panel, in the disclosed embodiment, looks like what is disclosed in FIGS. 3A and B. The processed form shown in FIGS. 3A-B is only exemplary, and those skilled in the art should recognize that printed members, other than being folded, could be formed into any number of simple or complex shapes for the purpose of being conformed into some particular vehicle design.

It should be noted that, although in the disclosed embodiments the starting preprocessed member is flat, printed, and then formed, it is also possible that the article could be initially of some more complex shape, and that some sort of three-dimensional printing be performed to decorate simple, or even complex surfaces on the thing.

Figure 4:
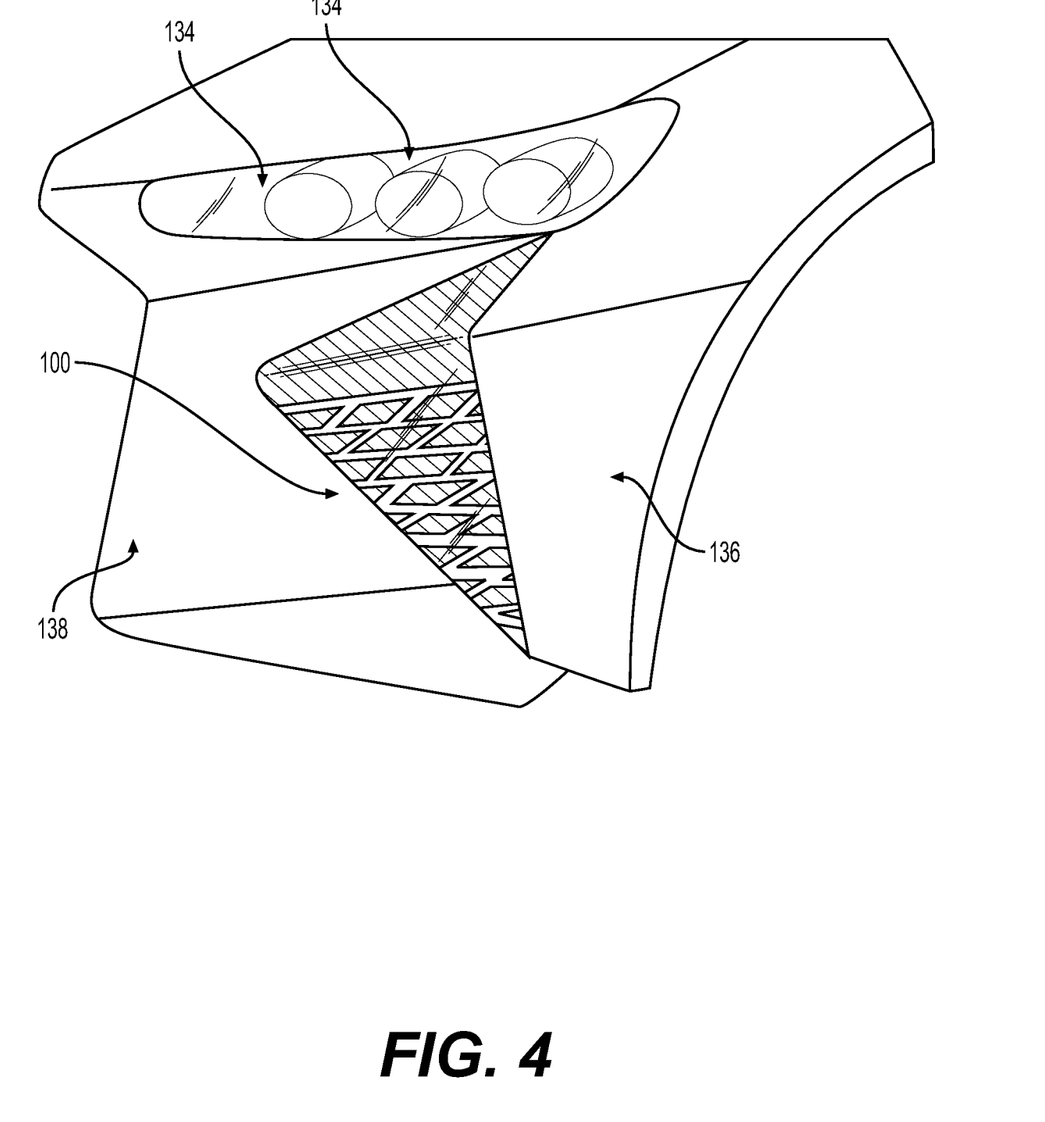
FIG. 4 shows the completed device as it might be installed on a vehicle.

FIG. 4 shows how a fully-processed article can be incorporated into a portion of an ultimate vehicle exterior design. As can be seen, fully formed panel 100 is incorporated with surrounding structures (e.g., surrounding fascias 136 and 138) such that the edges match up, and such that it is fluid with the surrounding surface configurations as a part of an overall design. The incorporation here is made into the area beneath the vehicle headlight 134.

Figure 5:
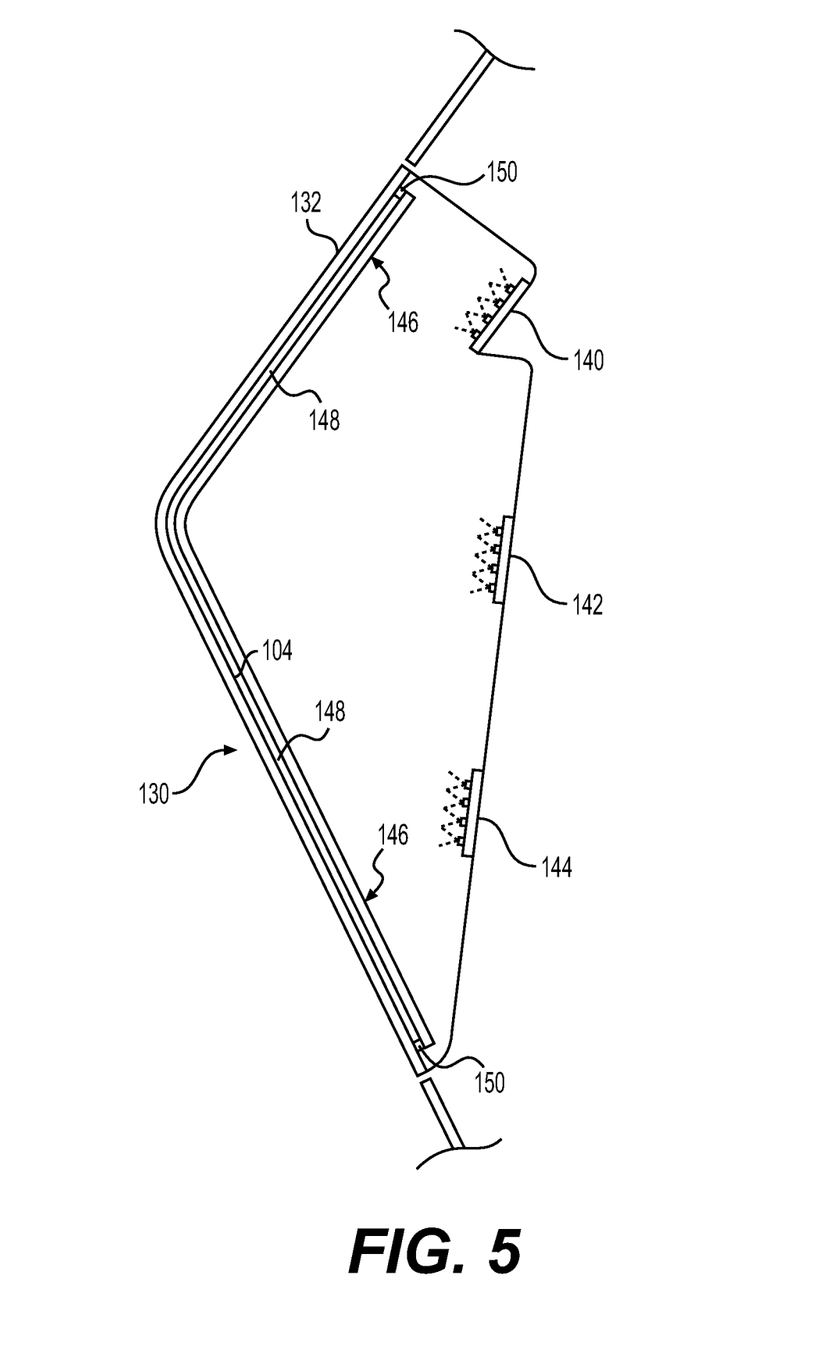
FIG. 5 shows a lighting arrangement concealed behind the device.

FIG. 5 discloses how a lighting arrangement can be used to illuminate the fully formed panel from behind. For example, upper panel 132 can be selectively illuminated using an upper LED PCB arrangement 140 (e.g., for embodiments where the upper panel 132 is not completely occlusive). Dual lower LED PCB arrangements 142 and 144 are provided to illuminate the lower panel. In embodiments, the LED arrangements 140, 142, and 144 can be separately controlled, and in embodiments can be used to create animations of various designs printed onto the inside surface 104. Again, in the disclosed embodiments, the top portion 132 of panel 100 above the bend is printed with a solid color, and is made to be occlusive or translucent. Where portion 132 is totally occluded, there would be no need for the LEDs 140. In the disclosed embodiment where lower portion 130 is made to have the honeycomb configuration shown in the earlier FIGS. 2-4, the lights 142 and 144 could be used to simply illuminate the pattern at night, or to blink, or to create some other sort of animation. The lighting could be automatic, or manually controlled. Any of the LEDs can be used to selectively or dynamically illuminate the printed graphic created. Regardless, an ornamentally pleasing illuminated effect can be created, and even include animation where automated. Further, the lower and upper LEDs could all be configured to illuminate together in a coordinated manner under control of a controller.

Also shown in FIG. 5 is an optional incorporation of a light-homogenizing optical sheet 146. Optical sheet 146 is mounted, in the disclosed embodiment, on a peripheral rib 150. Rib 150 travels all about the periphery of the inside surface 104 of the lens 132. The ribs create a gap 148 between the inside surface 104 and the optical sheet 146. The optical sheet, in embodiments, is intended to homogenize the light received from the light sources 140, 142, and 144 before it is introduced through the portions 130 and 132 of the lens.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and sub-combinations are of utility and may be employed without reference to other features and subcombinations and are contemplated within the scope of the claims. Not all steps listed in the various figures need be carried out in the specific order described.

Features described above as well as those claimed below may be combined in various ways without departing from the scope hereof. The following examples illustrate some possible, non-limiting combinations:

(A1) A method of making a fascia for an automobile may include the steps of: (i) providing an article, the article being one of translucent or transparent; (ii) applying a deposited pattern onto at least a first portion of a first side of the article; and (iii) forming the article into a shape, the shape being configured to be consonant with a vehicle exterior configuration.

(A2) For the method denoted as (A1), using a printing process to accomplish the applying step.

(A3) For the methods denoted as either or both of (A1) or (A2), executing the printing process using an inkjet printing process.

(A4) For the methods denoted as one or more of (A1) through (A3), executing the printing process using a flatbed printer.

(A5) For the methods denoted as either or both of (A1) or (A2), executing the printing process using a multi-axis robotic system.

(A6) For the methods denoted as one or more of (A1), (A2), or (A5), using an inkjet head mounted to the multi-axis robotic system to print the deposited pattern onto a non-flat three-dimensional surface of the article.

(A7). For the methods denoted as one or more of (A1), (A2), (A5), or (A6), drying the deposited pattern on the article using ultraviolet (UV) light.

(A8) For the method denoted as (A1), depositing a protective coating atop the ink once deposited.

(A9) For the method denoted as (A1), selecting a flat member to serve as the article in the providing step; and configuring the article into a non-flat shape during the forming step.

(A10) For the method denoted as (A1), selecting a substantially transparent material to comprise the article in the providing step; allowing the first portion, once subjected to the deposited pattern, to retain at least portions of transparency or translucence; and depositing a substantially occlusive ink or paint onto a second portion of the first side of the article.

(A11) For the method denoted as (A1), configuring the shape of the article during the forming step such that the first side of the article is internal, thus protecting the deposited pattern against the elements.

(A12) For the method denoted as (A1), selecting, in the providing step, a clear thermoplastic as a material for which the article is constructed.

(A13) For the methods denoted as either or both of (A1) and (A12), selecting one of Polycarbonate, Poly(methyl methacrylate) (PMMA), Polypropylenes (PPs), Natural PP, Polycarbonate (PC) blended with Acrylonitrile Butadiene Styrene polymer (ABS), or Natural PC/ABS as the thermoplastic.

(A14) For the method denoted as (A1), installing the article onto a vehicle after the forming step and causing the deposited pattern to be animated by illumination created behind the article.

(A15) For the methods denoted as either or both of (A1) and (A14), creating the animation by selectively turning on and off different LEDs in a plurality of LEDs.

(A16) For the method denoted as (A1), the providing step including cutting the article from a sheet to create an initial flat shape.

(A17) For the method denoted as either or both of (A1) and (A16), cutting the article such that the flat shape is generally triangular, and has sharp and rounded corners.

(A18) For the method denoted as (A1), using one of a lithographic press or digital press to accomplish the applying step.

(A19) For the method denoted as (A1), the forming step further comprising: heating, molding, and then cooling the article to create a permanent fold in the article, the fold contributing to an ultimate configuration of the article, the ultimate configuration being consonant with surrounding fascia configurations in an automotive design.

(A20) For the method denoted as either or both of (A1) or (A19), the heating, molding, and then cooling steps further comprising: leaving first and second planar portions on either side of the permanent fold, the permanent fold serving as a transition between the deposited pattern and a remaining portion of the article.

(A21) For the method denoted as one or more of (A1), (A19) or (A20), depositing a different pattern onto the remaining portion of the article.

(A22) A fascia system including: a transparent member mounted on a vehicle, the member having printed matter on one side of the member; and the member being included into a vehicle exterior design, the member being oriented in front of an illumination device, the printed matter being illuminated by the device.

(A23) The fascia system denoted as (A22) where different portions of the member being configured to be all of: (i) substantially occlusive, (ii) patterned, and (iii) either transparent or translucent.

(A24) The fascia system denoted as (A22) having a homogenizing optical sheet between the illumination device and the transparent member.

The invention claimed is:

1. A method of making a fascia for an automobile, the method comprising:
providing a substantially flat thermoplastic article, the article being one of translucent or transparent;
printing a pattern onto at least a first portion of a first side of the article;
creating the article to have an occlusive portion and either transparent or translucent other portions;
drying the pattern on the article using ultraviolet (UV) light;
forming the substantially flat article into a shape, the shape being configured to be consonant with a vehicle exterior configuration and wherein the first side of the article is internal to a lamp housing;
establishing a back-lighting arrangement behind the article; and
configuring the back-lighting arrangement to avoid the occlusive portion.

2. The method of claim 1 comprising:
executing the printing step using an inkjet printing process.

3. The method of claim 1 comprising:
executing the printing step using a multi-axis robotic system.

4. The method of claim 3 comprising:
using an inkjet head mounted to the multi-axis robotic system to print the deposited pattern onto a non-flat three-dimensional surface of the article.

5. The method of claim 1 comprising:
depositing a protective coating atop the ink once deposited.

6. The method of claim 1 comprising:
selecting one of Polycarbonate, Poly(methyl methacrylate) (PMMA), Polypropylenes (PPs), Natural PP, Polycarbonate (PC) blended with Acrylonitrile Butadiene Styrene polymer (ABS), or Natural PC/ABS as the thermoplastic.

7. The method of claim 1 comprising:
installing the article onto a vehicle after the forming step and causing the deposited pattern to be animated by illumination created behind the article.

8. The method of claim 7 comprising:
creating the animation by selectively turning on and off different LEDs in a plurality of LEDs.

9. The method of claim 1 wherein the providing step comprises:
cutting the article from a sheet to create an initial flat shape.

10. The method of claim 9 comprising:
cutting the article such that the flat shape is generally triangular, and has sharp and rounded corners.

11. The method of claim 1 comprising:
using one of a lithographic press or digital press to accomplish the printing step.

12. The method of claim 1 wherein the forming step further comprises:
heating, molding, and then cooling the article to create a permanent fold in the article, the fold contributing to an ultimate configuration of the article, the ultimate configuration being consonant with surrounding fascia configurations in an automotive design.

13. The method of claim 12 wherein the heating, molding, and then cooling steps further comprise:
leaving first and second planar portions on either side of the permanent fold, the permanent fold serving as a transition between the deposited pattern and a remaining portion of the article.

14. The method of claim 13 comprising:
depositing a different pattern onto the remaining portion of the article.

15. A method of making a fascia for an automobile, the method comprising:
providing a substantially flat article;
printing a pattern onto a first side of the article wherein the pattern includes: a substantially occlusive portion, and one or more transparent or translucent portions;
drying the deposited pattern on the article using ultraviolet (UV) light;
forming the article into a shape, the shape being configured to be consonant with a vehicle exterior configuration and wherein the first side of the article is internal;
installing a homogenizing optical sheet between one or more LED light sources and the first side of the article such that the first side of the article is directly exposed to an air gap established between the article and the homogenizing optical sheet; and;
directing the one or more LED light sources to illuminate through a transparent or a translucent portion of the article while avoiding an occluded portion of the article to create an optical effect.

16. The method of claim 15 comprising:
creating an animation by selectively turning on and off different LEDs in a plurality of LEDs of the one or more LED light sources.

17. The method of claim 15 comprising:
configuring the one or more LED light sources to selectively illuminate an upper panel area and a lower panel area of the article.

* * * * *

UNITED STATES PATENT AND TRADEMARK OFFICE
CERTIFICATE OF CORRECTION

Page 1 of 1

PATENT NO. : 12,138,946 B2
APPLICATION NO. : 16/807989
DATED : November 12, 2024
INVENTOR(S) : Todd Nykerk It is certified that error appears in the above-identified patent and that said Letters Patent is hereby corrected as shown below:

In the Claims

Column 8, Line 4: Remove "25."

Signed and Sealed this
First Day of April, 2025

Coke Morgan Stewart
*Acting Director of the United States Patent and Trademark Office*